(12) United States Patent
Nagai et al.

(10) Patent No.: US 8,976,687 B2
(45) Date of Patent: Mar. 10, 2015

(54) BROADCASTING METHOD AND ACCESS CONTROL APPARATUS

(75) Inventors: Makoto Nagai, Kakamigahara (JP); Keisuke Higuchi, Gifu (JP); Ken Nakaoka, Ichinomiya (JP); Yoshiharu Doi, Mizuho (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 413 days.

(21) Appl. No.: 13/056,882

(22) PCT Filed: Jul. 30, 2009

(86) PCT No.: PCT/JP2009/003613
§ 371 (c)(1),
(2), (4) Date: Jan. 31, 2011

(87) PCT Pub. No.: WO2010/013477
PCT Pub. Date: Feb. 4, 2010

(65) Prior Publication Data
US 2011/0134789 A1    Jun. 9, 2011

(30) Foreign Application Priority Data

Jul. 31, 2008   (JP) .................................. 2008-198941
Jul. 31, 2008   (JP) .................................. 2008-198942

(51) Int. Cl.
| | | |
|---|---|---|
| H04W 24/00 | (2009.01) | |
| G08G 1/09 | (2006.01) | |
| H04W 72/00 | (2009.01) | |
| H04W 72/08 | (2009.01) | |

(52) U.S. Cl.
CPC ................ *G08G 1/092* (2013.01); *G08G 1/094* (2013.01); *H04W 72/005* (2013.01); *H04W 72/082* (2013.01); *Y02B 60/50* (2013.01)
USPC ........... 370/252; 370/338; 370/445; 370/447; 455/437; 455/452.2

(58) Field of Classification Search
CPC .. H04W 74/04; H04W 72/12; H04W 74/0808
USPC ........... 370/345, 443, 509, 458, 332, 338, 44; 455/540, 452.1, 452.2, 437
See application file for complete search history.

(56) References Cited

U.S. PATENT DOCUMENTS 5,995,498 A  * 11/1999  Toot et al. ..................... 370/332
6,252,885 B1 *  6/2001  Yashiro et al. ................ 370/443
(Continued)

FOREIGN PATENT DOCUMENTS

| JP | 10-209956 | 8/1998 |
|---|---|---|
| JP | 11-331927 | 11/1999 |

(Continued)

OTHER PUBLICATIONS

International Search Report issued in International Application No. PCT/JP2009/003613 dated Aug. 25, 2009.
(Continued)

*Primary Examiner* — Charles C Jiang
*Assistant Examiner* — Mohamed Kamara
(74) *Attorney, Agent, or Firm* — McDermott Will & Emery LLP

(57) ABSTRACT

It is specified that a frame containing at least the plurality of slots is repeated. A detecting unit detects a slot usable in the communications between terminal apparatuses, from among a plurality of slots. A modem unit and an RF unit broadcast the information on the detected slot. A power measuring unit in the detecting unit measures the respective received powers of the plurality of slots, and an empty slot identifying unit identifies a slot whose received power is less than a threshold value.

11 Claims, 11 Drawing Sheets

(56) References Cited

U.S. PATENT DOCUMENTS

| | | |
|---|---|---|
| 8,503,343 B2 | 8/2013 | Kawakami et al. |
| 2001/0021655 A1* | 9/2001 | Maeshima ................. 455/507 |
| 2004/0214582 A1* | 10/2004 | Lan et al. .................. 455/452.2 |
| 2006/0099956 A1* | 5/2006 | Harada et al. ............. 455/452.2 |
| 2006/0146887 A1* | 7/2006 | Muguruma et al. ......... 370/503 |
| 2007/0211686 A1* | 9/2007 | Belcea et al. ............... 370/345 |
| 2008/0075127 A1* | 3/2008 | Fourcand ................... 370/509 |
| 2008/0316966 A1* | 12/2008 | Joshi et al. ................. 370/330 |
| 2011/0069774 A1* | 3/2011 | Wang et al. ................ 375/267 |

FOREIGN PATENT DOCUMENTS

| | | |
|---|---|---|
| JP | 2005-202913 | 7/2005 |
| JP | 2006-086563 | 3/2006 |
| JP | 2007-235830 | 9/2007 |
| JP | 2008-148131 | 6/2008 |
| JP | 2010028636 A | 2/2010 |

OTHER PUBLICATIONS

Transmittal of International Preliminary Report on Patentability, w/ English translation thereof, issued in International Application No. PCT/JP2009/003613 dated Mar. 17, 2011.

Japanese Office Action issued in Japanese Patent Application No. 2008-198941, dated Nov. 27, 2012.

Japanese Office Action issued in Japanese Patent Application No. 2008-198942, dated Nov. 27, 2012.

* cited by examiner

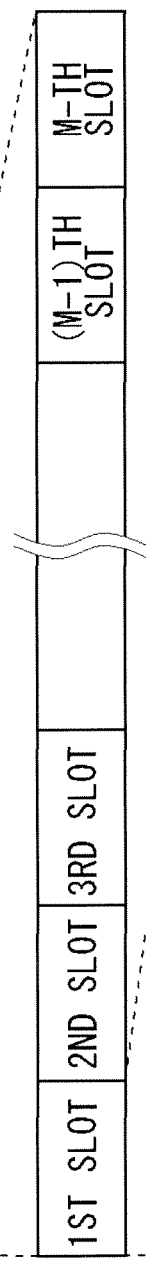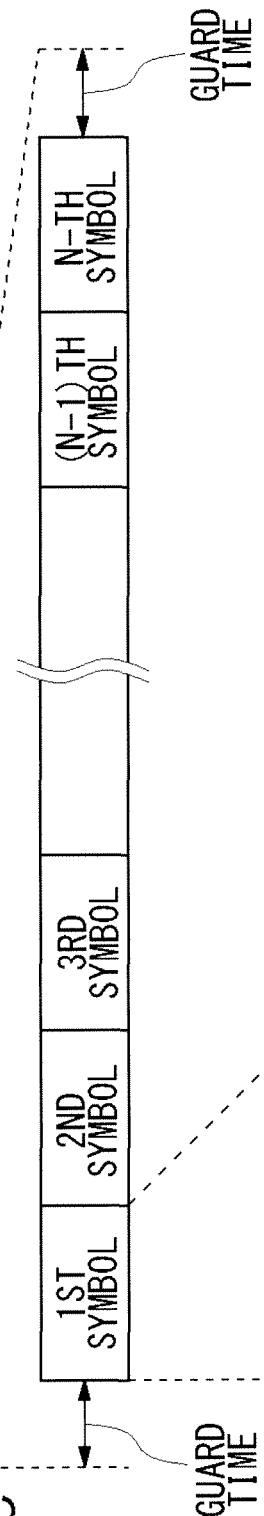

FIG.4A

| | | | | | | | |
|---|---|---|---|---|---|---|---|
| 31 | N | N | N | -1 | D | D | D |
| 30 | N | N | N | -2 | N | N | N |
| 29 | N | N | N | -3 | D | D | D |
| 28 | N | N | N | -4 | D | D | D |
| 27 | N | N | N | -5 | D | D | D |
| 26 | D | D | D | -6 | D | D | D |
| 25 | D | D | D | -7 | P | P | P |
| 24 | D | D | D | -8 | D | D | D |
| 23 | D | D | D | -9 | D | D | D |
| 22 | D | D | D | -10 | D | D | D |
| 21 | P | P | P | -11 | D | D | D |
| 20 | D | D | D | -12 | D | D | D |
| 19 | D | D | D | -13 | D | D | D |
| 18 | D | D | D | -14 | D | D | D |
| 17 | D | D | D | -15 | D | D | D |
| 16 | D | D | D | -16 | D | D | D |
| 15 | D | D | D | -17 | D | D | D |
| 14 | D | D | D | -18 | D | D | D |
| 13 | D | D | D | -19 | D | D | D |
| 12 | D | D | D | -20 | D | D | D |
| 11 | D | D | D | -21 | P | P | P |
| 10 | D | D | D | -22 | D | D | D |
| 9 | D | D | D | -23 | D | D | D |
| 8 | D | D | D | -24 | D | D | D |
| 7 | P | P | P | -25 | D | D | D |
| 6 | D | D | D | -26 | N | N | N |
| 5 | D | D | D | -27 | N | N | N |
| 4 | D | D | D | -28 | N | N | N |
| 3 | D | D | D | -29 | N | N | N |
| 2 | N | N | N | -30 | N | N | N |
| 1 | D | D | D | -31 | N | N | N |
| 0 | N | N | N | -32 | N | N | N |

| | | | | | | | |
|---|---|---|---|---|---|---|---|
| 31 | N | N | N | -1 | N | N | N |
| 30 | N | N | N | -2 | N | N | N |
| 29 | N | N | N | -3 | D | D | D |
| 28 | N | N | N | -4 | D | D | D |
| 27 | N | N | N | -5 | D | D | D |
| 26 | D | D | D | -6 | D | D | D |
| 25 | D | D | D | -7 | P | P | P |
| 24 | D | D | D | -8 | D | D | D |
| 23 | D | D | D | -9 | D | D | D |
| 22 | D | D | D | -10 | D | D | D |
| 21 | P | P | P | -11 | D | D | D |
| 20 | D | D | D | -12 | D | D | D |
| 19 | D | D | D | -13 | D | D | D |
| 18 | D | D | D | -14 | D | D | D |
| 17 | D | D | D | -15 | D | D | D |
| 16 | D | D | D | -16 | D | D | D |
| 15 | D | D | D | -17 | D | D | D |
| 14 | D | D | D | -18 | D | D | D |
| 13 | D | D | D | -19 | D | D | D |
| 12 | D | D | D | -20 | D | D | D |
| 11 | D | D | D | -21 | P | P | P |
| 10 | D | D | D | -22 | D | D | D |
| 9 | D | D | D | -23 | D | D | D |
| 8 | D | D | D | -24 | D | D | D |
| 7 | P | P | P | -25 | D | D | D |
| 6 | D | D | D | -26 | N | N | N |
| 5 | D | D | D | -27 | N | N | N |
| 4 | D | D | D | -28 | N | N | N |
| 3 | D | D | D | -29 | N | N | N |
| 2 | N | N | N | -30 | N | N | N |
| 1 | N | N | N | -31 | N | N | N |
| 0 | N | N | N | -32 | N | N | N |

...

BROADCASTING METHOD AND ACCESS CONTROL APPARATUS

RELATED APPLICATIONS

This application is the U.S. National Phase under 35 U.S.C. §371 of International Application No. PCT/JP2009/003613, filed on Jul. 30, 2009, which in turn claims the benefit of Japanese Application No. 2008-198941, filed on Jul. 31, 2008 and Japanese Application No, 2008-198942, filed on Jul. 31, 2008, the disclosures of which Applications are incorporated by reference herein.

TECHNICAL FIELD

The present invention relates to an annunciation (broadcasting) technology and, more particularly, to a broadcasting method for sending signals containing predetermined information and an access control apparatus therefor.

BACKGROUND TECHNOLOGY

Road-to-vehicle communication has been under investigation in an effort to prevent collision accidents of vehicles on a sudden encounter at an intersection. In a road-to-vehicle communication, information on conditions at an intersection is communicated between a roadside unit and an on-board equipment. Such a road-to-vehicle communication requires installation of roadside units, which means a great cost of time and money. In contrast to this, a vehicle-to-vehicle (inter-vehicular) communication, in which information is communicated between on-board equipments, has no need for installation of roadside units. In that case, current position information is detected in real time by GPS (Global Positioning System) or the like and the position information is exchanged between the on-board equipments. Thus it is determined on which of the roads leading to the intersection the driver's vehicle and the other vehicles are located (See Patent Document 1, for instance).

PRIOR ART DOCUMENTS

Patent Documents

[Patent Document 1] Japanese Unexamined Patent Application Publication No. 2005-202913.

Used in wireless LANs (Local Area Networks) conforming to standards, such as IEEE 802.11, is an access control function called Carrier Sense Multiple Access with Collision Avoidance (CSMA/CA). In such a wireless LAN, therefore, the same wireless channel is shared by a plurality of terminal apparatuses. Such CSMA/CA is subject to conditions involving mutual wireless signals not reaching the targets, namely, carrier sense not functioning, due to the effects of distance between the terminal apparatuses or obstacles attenuating the radio waves. When the carrier sense does not function, there occur collisions of packet signals transmitted from a plurality of terminal apparatuses. Also, wireless LANs employ the OFDM modulation scheme to achieve faster communication speed.

On the other hand, when a wireless LAN is applied to the inter-vehicular communication, a need arises to transmit information to a large indefinite number of terminal apparatuses, and therefore it is desirable that signals be sent by broadcast. Yet, at an intersection or like places, an increase in the number of vehicles, that is, the number of terminal apparatuses, is considered to cause an increase in the collisions of the packet signals therefrom. In consequence, data contained in the packet signals may not be transmitted to the other terminal apparatuses. If such a condition occurs in the inter-vehicular communication, then the objective of preventing collision accidents of vehicles on a sudden encounter at an intersection will not be attained.

The present invention has been made in view of the foregoing circumstances, and the purpose thereof is to provide a technology for reducing the collision probability of packet signals under conditions of increased volume of communication.

Means for Solving the Problems

In order to resolve the above problems, an access control apparatus according to one embodiment of the present invention controls communications between terminal apparatuses, and the access control apparatus comprises: a detecting unit configured to detect a predetermined slot from among a plurality of slots, wherein it is specified that a frame containing at least the plurality of slots is repeated; and a broadcasting unit configured to broadcast information on the slot detected by the detecting unit.

Another embodiment of the present invention relates also to an access control apparatus. The apparatus controls communications between terminal apparatuses, and it comprises: a detecting unit configured to detect a slot usable in the communications between the terminal apparatuses, from among a plurality of slots, wherein it is specified that a frame containing at least the plurality of slots is repeated; and a broadcasting unit configured to broadcast information on the slot detected by the detecting unit.

Still another embodiment of the present invention relates also to an access control apparatus. The apparatus controls communications between terminal apparatuses, and it comprises: a detecting unit configured to detect a slot, in which a collision has occurred due to duplicate transmission of signals from a plurality of terminal apparatuses, wherein a frame containing at least a plurality of slots is repeated and the terminal apparatuses communicate with each other using a predetermined slot; and a broadcasting unit configured to broadcast information on the slot detected by the detecting unit.

Still another embodiment of the present invention relates to a broadcasting method. The method is employed in an access control apparatus for controlling communications between terminal apparatuses, and the method comprises: detecting a predetermined slot from among a plurality of slots, wherein it is specified that a frame containing at least the plurality of slots is repeated; and broadcasting information on the detected slot.

Still another embodiment of the present invention relates also to a broadcasting method. The method is employed in an access control apparatus for controlling communications between terminal apparatuses, and the method comprises: detecting a slot usable in the communications between the terminal apparatuses, from among a plurality of slots, wherein it is specified that a frame containing at least the plurality of slots is repeated; and broadcasting information on the detected slot.

Still another embodiment of the present invention relates also to a broadcasting method. The method is employed in an access control apparatus for controlling communications between terminal apparatuses, and the method comprises: detecting a slot, in which a collision has occurred due to duplicate transmission of signals from a plurality of terminal apparatuses, wherein a frame containing at least a plurality of slots is repeated and the terminal apparatuses communicate with each other using a predetermined slot; and broadcasting information on the detected slot.

Optional combinations of the aforementioned constituting elements, and implementations of the invention in the form of methods, apparatuses, systems, recording media, computer programs and so forth may also be practiced as additional modes of the present invention.

Effect of the Invention

The present invention reduces the collision probability of packet signals under conditions of increased volume of communication.

BRIEF DESCRIPTION OF THE DRAWINGS

FIGS. 3A to 3D show formats of frames specified by a frame specifying unit of FIG. 2.

FIGS. 4A and 4B each shows a format of OFDM symbol used in the communication system of FIG. 1.

BEST MODE FOR CARRYING OUT THE INVENTION

Figure 1:
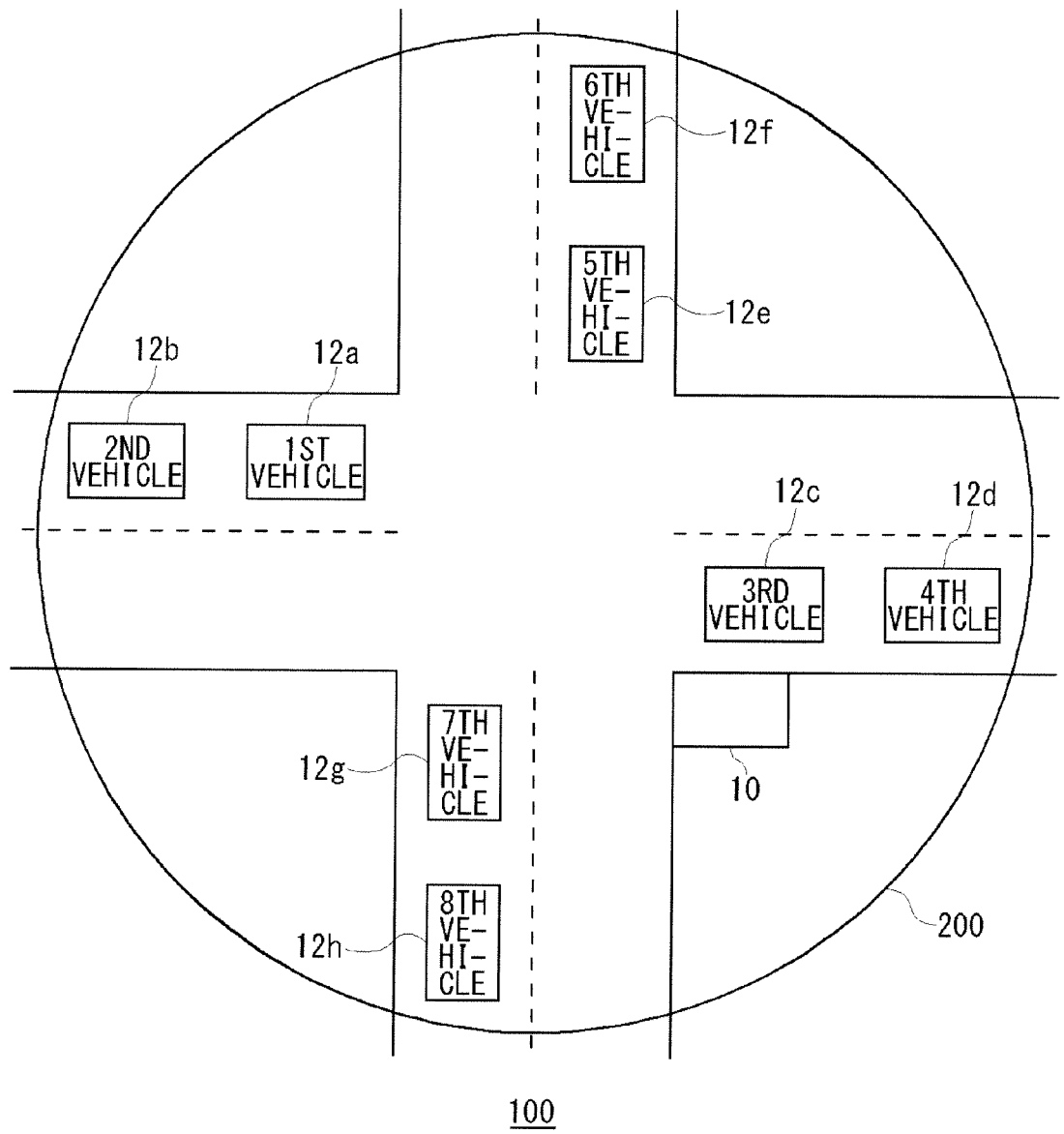
FIG. 1 shows a structure of a communication system according to an exemplary embodiment of the present invention.

The present invention will be outlined before it is explained in detail. The exemplary embodiments of this invention relate to a communication system carrying out data communication between terminal apparatuses installed in vehicles. A terminal apparatus transmits, by broadcast, packet signals containing information such as the traveling speed and position of a vehicle (hereinafter referred to as "data"). And the other terminal apparatuses receive the packet signals and recognize the approach or the like of the vehicle based on the data. Note here that the terminal apparatuses employ the OFDM modulation scheme to achieve faster communication speed. Under these circumstances, an increase in the number of terminal apparatuses at an intersection or like place increases the probability of packet signals occurring. To cope with it, the communication system according to the present exemplary embodiment executes the following processes.

The communication system according to the present exemplary embodiment includes an access control apparatus in addition to a plurality of terminal apparatuses, and the access control apparatus is installed at an intersection, for instance. The access control apparatus repeatedly specifies a frame containing a plurality of slots. The access control apparatus identifies slots not used in communication among a plurality of terminal terminals (hereinafter referred to as "empty slots" or "unused slots") by measuring the received power in each slot. Also, the access control apparatus adds frame constituent information and information on the identified slots to control information and transmits, by broadcast, a packet signal containing the control information (hereinafter referred to sometimes as "control information" also) using a single slot. It is to be understood here that the single slot is one determined beforehand. A terminal apparatus selects any of the empty slots based on the control information and transmits, by broadcast, a packet signal containing data (hereinafter referred to sometimes as "data" also) using the selected slot. Note that the terminal apparatus, when transmitting data over a plurality of frames, uses the same slots in corresponding timing in each frame.

The access control apparatus identifies slots having any collision (hereinafter referred to as "collision slots") by measuring in each slot for any collision of packet signals transmitted by a plurality of terminal apparatuses. The access control apparatus also adds information on the identified slots to the control information. A terminal apparatus checks for the presence of any collision in the already used slots, based on the control information. When there is any collision, the terminal apparatus selects any one of the other empty slots, based on the control information. Note here that the access control apparatus has no direct involvement in data communication between terminal apparatuses, that is, the access control apparatus does not directly specify the slot to be used in the data communication. In other words, the access control apparatus monitors the condition of data communication between terminal apparatuses and keeps broadcasting information on unused slots and collision slots.

It is to be noted that since the control information is also transmitted in a single slot, there are chances that the data transmitted from a terminal apparatus incapable of receiving the control information may collide with the control information. In consequence, if the other terminal apparatuses cannot receive the control information, then there arises a difficulty of carrying out the aforementioned processes. To cope with this situation, the OFDM signals used in transmitting data have some of the subcarriers as null carriers in which no data is contained (these subcarriers being hereinafter referred to as "identification carriers"). On the other hand, the OFDM signals used in transmitting control information have signals placed in the identification carriers, too. Hence, even when there is a collision between data and control information, the terminal apparatus can detect the presence of control information by observing the signal components of the identification carrier.

FIG. 1 shows a structure of a communication system 100 according to an exemplary embodiment of the present invention. FIG. 1 corresponds to a case thereof at an intersection viewed from above. The communication system 100 includes an access control apparatus 10 and a first vehicle 12a, a second vehicle 12b, a third vehicle 12c, a fourth vehicle 12d, a fifth vehicle 12e, a sixth vehicle 12f, a seventh vehicle 12g, and an eighth vehicle 12h, which are generically referred to as "vehicle 12" or "vehicles 12". It is to be noted that each vehicle 12 has a not-shown terminal apparatus installed therein. Also, an area 200 is formed by the access control apparatus 10.

As shown in FIG. 1, a road extending in the horizontal, or left-right, direction and a road extending in the vertical, or up-down, direction in FIG. 1 intersect with each other in the central portion thereof. Note here that the upper side of FIG. 1 corresponds to the north, the left side thereof the west, the down side thereof the south, and the right side thereof the east. And the portion where the two roads intersect each other is the intersection. The first vehicle 12a and the second vehicle 12b are advancing from left to right, while the third vehicle 12c and the fourth vehicle 12d are advancing from right to left. Also, the fifth vehicle 12e and the sixth vehicle 12f are advancing downward, while the seventh vehicle 12g and the eighth vehicle 12h are advancing upward.

The terminal apparatus installed in each of the vehicles 12 acquires data and transmits, by broadcast, a packet signal containing the data. Here, before explaining exemplary embodiments of the present invention, a description will be given of an operation of a terminal apparatus which is compatible with a known wireless LAN, i.e., CSMA/CA. Each terminal apparatus transmits data by broadcast when it has determined by executing carrier sense that transmission is possible. Consequently, there are chances of data from a plurality of terminal apparatuses colliding with each other. Also, as the number of terminal apparatuses increases, there will be greater probability of collisions occurring. In particular, at locations like intersections, the likelihood of data collision is greater despite the fact that the likelihood of vehicles 12 colliding with each other is also great. This means failed utilization of data in spots where data is in the greatest demand.

Therefore, the communication system 100 places an access control apparatus 10 at each intersection. The access control apparatus 10 generates a frame containing a plurality of slots repeatedly based on the signals received from a not-shown GPS satellite. Also, the access control apparatus 10 identifies empty slots and collision slots out of the plurality of slots. The method for identifying the empty slots and collision slots will be discussed later. The access control apparatus 10 adds information on the identified empty slots and collision slots to control information. Further, the access control apparatus 10 broadcasts the control information, using a predetermined slot. For example, the access control apparatus 10 broadcasts the control information, using the leading slot of each frame.

A plurality of terminal apparatuses receive the control information broadcast by the access control apparatus 10 and selects one of the empty slots. Also, each terminal apparatus broadcasts data, using a selected slot. Note here that the terminal apparatus broadcasts the data, using a slot corresponding to the selected slot for a plurality of frames. For example, when a tenth slot from the top of a frame has been selected, it is the tenth slot from the top of a frame that must be used for the next frame also. It is to be noted that when there is an indication in control information that the slot being used is a collision slot, the terminal apparatus further selects another empty slot. The terminal apparatus repeats the above-described processing for the duration in which the terminal apparatus can receive the control information broadcast by the access control apparatus 10. In other words, the terminal apparatus watches for control information and detects its entry in the area 200 when the terminal apparatus has received the control information. It is to be appreciated that the terminal apparatus can broadcast data even when the terminal apparatus is not receiving control information. The terminal apparatus which has received data from the other terminal apparatuses recognizes, based on the data, the presence of vehicles 12 that are carrying the other terminal apparatuses.

Note here that both the control information broadcast from the access control apparatus 10 and the data broadcast from the terminal apparatuses use OFDM signals. However, it is not the same subcarriers in which the control information and the data are placed. The data is not placed in the aforementioned identification carriers. On the other hand, identification information is placed not only in the subcarriers where the data is placed but also in the identification carriers. As a result, even when there is a collision between data and identification information, the terminal apparatus can detect the presence of control information by observing the signal components of identification carriers. It should be noted that the aforementioned detection of entry into the area 200 by the terminal apparatus may be made relative to the identification carriers.

Figure 2:
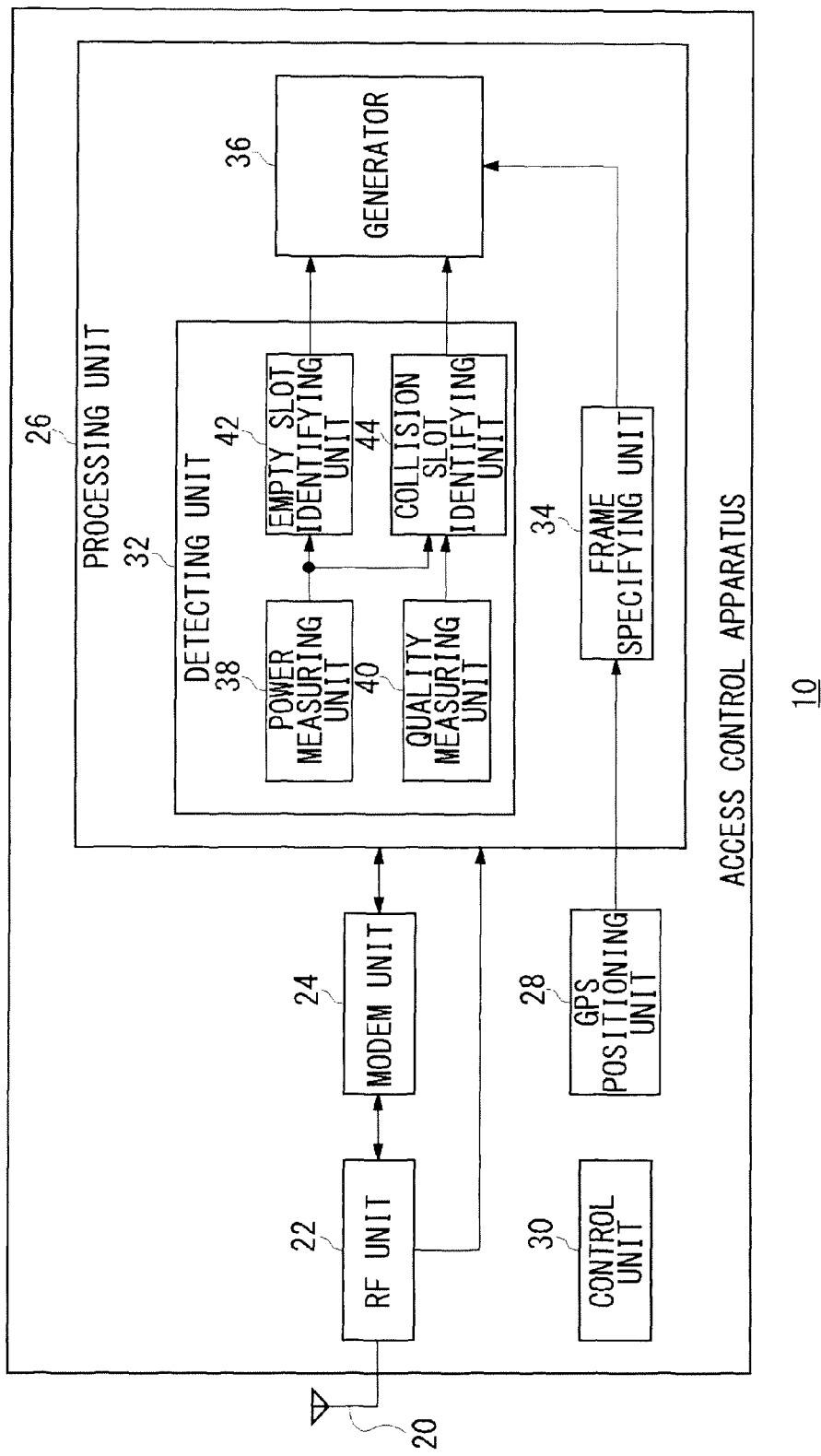
FIG. 2 shows a structure of an access control apparatus of FIG. 1.

FIG. 2 shows a structure of the access control apparatus 10. The access control apparatus 10 includes an antenna 20, an RF unit, a modem unit 24, a processing unit 26, a GPS positioning unit 28, and a control unit 30. The processing unit 26 includes a detecting unit 32, a frame specifying unit 34, and a generator 36. The detecting unit 32 includes a power measuring unit 38, a quality measuring unit 40, an empty slot identifying unit 42, and a collision slot identifying unit 44.

The GPS positioning unit 28 receives signals from a not-shown GPS satellite and acquires information on the time of day based on the received signals. It should be noted that known art can be used for the acquisition of information on the time of day and therefore the description thereof is omitted here. The GPS positioning unit 28 outputs the information on the time of day to the frame specifying unit 34. The frame specifying unit 34 acquires information on the time of day from the GPS positioning unit 28. The frame specifying unit 34 generates a plurality of frames based on the information on the time of day. For example, the frame specifying unit 34 generates ten "100 msec" frames by dividing a duration of "1 sec" into 10 parts from the timing of "0 msec". Frames are thus defined and specified repeatedly through the repetition of this process.

Also, the frame specifying unit 34 generates a plurality of slots by dividing each frame into a plurality of parts. For example, each frame is divided into 200 parts to generate 200 units of "500 μsec" slot. As previously indicated, since the communication system 100 employs the OFDM modulation scheme, each slot is so specified as to be composed of a plurality of OFDM symbols. Also, an OFDM symbol comprises a guard interval (GI) and a valid symbol. Note that a guard time may be provided in the front portion and the rear portion of each slot. It is to be noted also that the combination of a plurality of OFDM symbols contained in a slot is equivalent to the packet signal mentioned earlier.

FIGS. 3A to 3D show the formats of frames specified by the frame specifying unit 34. FIG. 3A shows a structure of frames. As shown in FIG. 3A, a plurality of frames, such as i-th frame to (i+2)th frame, are specified repeatedly. Also, the duration of each frame is "100 msec", for instance. FIG. 3B shows a structure of a single frame. As shown in FIG. 3B, a single frame consists of M units of slots. For example, M is "200", and the duration of each slot is "500 μsec". FIG. 3C shows a structure of a single slot. As shown in FIG. 3C, a guard time may be provided in the front portion and the rear portion of each slot. And the remaining duration of the slot consists of N units of OFDM symbols. FIG. 3D shows a structure of each OFDM symbol. As shown in FIG. 3D, each OFDM symbol consists of a GI and a valid symbol. Let us now refer back to FIG. 2.

The RF unit 22 receives through the antenna 20 a packet signal transmitted in communication between the other terminal apparatuses (not shown) in each slot, as a receiving processing. The RF unit 22 performs a frequency conversion on the packet signal of a radiofrequency received through the antenna 20 and thereby generates a packet signal of baseband. Further, the RF unit 22 outputs the baseband packet signal to the modem unit 24. Generally, a baseband packet signal is formed of an in-phase component and a quadrature component, and therefore it should be represented by two signal lines. However, it is represented by a single signal line here to make the illustration clearer for understanding.

Also, the RF unit 22 includes an LNA (Low Noise Amplifier), a mixer, an AGC unit, and an A-D conversion unit. The RF unit 22 performs a frequency conversion on the baseband packet signal inputted from the modem unit 24 and thereby generates a radiofrequency packet signal in each slot as a transmission processing. Further, the RF unit 22 transmits, through the antenna 20, the radiofrequency packet signal. The RF unit 22 also includes a PA (Power Amplifier), a mixer, and a D-A conversion unit.

The modem unit 24 demodulates the radiofrequency packet signal fed from the RF unit 22, as a receiving processing. Further, the modem unit 24 outputs the demodulation result to the processing unit 26. Also, the modem unit 24 modulates the data fed from the processing unit 26, as a transmission processing. Further, the modem unit 24 outputs the modulation result to the RF unit 22 as a baseband packet signal. It is to be noted here that the communication system 100 is compatible with the OFDM modulation scheme and therefore the modem unit 24 performs FFT (Fast Fourier Transform) as a receiving processing and performs IFFT (Inverse Fast Fourier Transform) as a transmission processing also.

The power measuring unit 38 receives a received signal from the RF unit 22 or the modem unit 24 and measures the received power. The received power herein is measured slot by slot. Hence, the power measuring unit 38 measures the received power for each of the plurality of slots. The power measuring unit 38 outputs the received power for each slot to the empty slot identifying unit 42 and the collision slot identifying unit 44. The quality measuring unit 40 receives the demodulation result from the modem unit 24 and measures the signal quality for each of the plurality of slots. The signal quality measured herein is the error rate. It should be noted that known art can be used for the measurement of the error rate, so that the description thereof is omitted here. Also, instead of the error rate, EVM (Error Vector Magnitude) or the like may be measured as the signal quality. The quality measuring unit 40 outputs the error rate to the collision slot identifying unit 44.

The empty slot identifying unit 42 receives the received power for each slot from the power measuring unit 38. The empty slot identifying unit 42 compares each received power against a threshold value (hereinafter referred to as "threshold value for empty slot") and identifies the slot for which the received power is smaller than the threshold value for empty slot. That is, the empty slot identifying unit 42 detects, from among a plurality of slots, a slot that can be used in communication between a plurality of terminal apparatuses, as an empty slot. Note here that when there are a plurality of empty slots, the empty slot identifying unit 42 identifies them as empty slots. The empty slot identifying unit 42 outputs information on the identified empty slots to the generator 36.

The collision slot identifying unit 44 receives the received power for each slot from the power measuring unit 38 and receives the error rate for each slot from the quality measuring unit 40. Also, the collision slot identifying unit 44 associates the received power with the error rate, slot by slot. The collision slot identifying unit 44 compares not only the received power against a first threshold value, but also the error rate against a second threshold value, slot by slot. The collision slot identifying unit 44 identifies, as a collision slot, a slot for which the received power is larger than the first threshold value and at the same time the error rate is higher than the second threshold value. That is, the collision slot identifying unit 44 recognizes, as a collision slot, a slot for which the received power is large but the communication quality is inferior. In this manner, the collision slot identifying unit 44 detects, as a collision slot, a slot in which a collision has occurred due to duplicate transmission of signals from a plurality of terminal apparatuses. The collision slot identifying unit 44 outputs information on the identified collision slots to the generator 36.

The generator 36 receives information on empty slots from the empty slot identifying unit 42 and also receives information on collision slots from the collision slot identifying unit 44. The generator 36 generates control information by adding the information on empty slots and the information on collision slots thereto. Note here that the numbers, 1, 2, . . . from the start (hereinafter referred to as "slot numbers") are given respectively to a plurality of slots contained in a frame. The generator 36 adds the slot number(s) of the empty slot(s) contained in the previous frame(s) as information on empty slots to the control information.

Also, the generator 36 adds the slot number(s) of the collision slot(s) contained in the previous frame(s) as information on collision slots to the control information. Further, the generator 36 receives information on frames and slots from the frame specifying unit 34 and periodically assigns the control information to one slot contained in each frame. The generator 36 assigns the control information to the slot with slot number "1", or the leading slot of each frame, which is predetermined herein. The generator 36 outputs the control information to the modem unit 24, using the thus assigned slot.

As described above, the communication system 100 is compatible with the OFDM modulation scheme and therefore the generator 36 generates the control information as an OFDM signal. Note here that the OFDM signals are also used for the communications between a not-shown plurality of terminal apparatuses. A description is given herein by comparing an OFDM signal that has the control information assigned (hereinafter this is called "control information" also) with an OFDM signal that has data assigned (hereinafter this is called "data" also). FIGS. 4A and 4B illustrate formats of OFDM symbols used in the communication system 100. FIG. 4A corresponds to control information, whereas FIG. 4B corresponds to data.

In both FIG. 4A and FIG. 4B, the vertical direction represents the frequency, whereas the horizontal direction represents time. The numbers "31", "30", . . . , "−32" are indicated from top along the vertical direction, and these are the numbers assigned to identify subcarriers (hereinafter referred to as "subcarrier numbers"). In OFDM signals, the frequency of a subcarrier whose subcarrier number is "31" is the highest, whereas the frequency of a subcarrier whose subcarrier number is "−32" is the lowest. In FIG. 4A and FIG. 4B, "D" corresponds to a data symbol, "P" a pilot symbol, and "N" a null.

What are common to the control information and the data are the subcarrier numbers "31" to "27", "2", "0", and "−2", and the subcarrier numbers "−26" to "−32" which are all null. Of the control information, the subcarrier numbers "26" to "3", "−3" to "−25" are also used in data, and the use of symbols is the same for both the control information and the data. Of the control information, on the other hand, the subcarrier numbers "1" and "−1" are not used for data. These correspond to the aforementioned identification carriers. That is, the identification carrier is assigned to a subcarrier near the center frequency of an OFDM signal. Of the control information, a guard band is provided between a subcarrier used also for data and the identification carrier, namely between the subcarrier number "2" and the subcarrier number "−2". The subcarriers of the subcarrier number "−2" through the subcarrier number "2" may be collectively called "identification carrier" or "identification carriers".

The generator 36 assigns the information on empty slots and the information on collision slots to subcarriers other than the identification carriers of the control information. Also, the generator 36 assigns the information on frames to the identification carrier. Also, the generator 36 may preferentially assign not only these items of information but also information having higher degrees of importance to the identification carrier. Also, a known signal is assigned to an OFDM symbol which is located anterior to the packet signal. Such a known signal is used for AGC (Automatic Gain Control) or used to estimate the channel characteristics. The generator 36 may assign a known signal to the identification carrier over a partial period of a predetermined slot. Such a known signal is used as a unique word (UW), for example. Let us now refer back to FIG. 2.

The control information generated in the modem unit 24, the RF unit 22 and the generator 36 are broadcast from the antenna 20. A terminal apparatus, which uses slots corresponding to the information on empty slots and information on the collision slots both contained in the control information, uses slots corresponding to said slots over a plurality of frames. For example, a slot whose slot number is "10" is used continuously. The control unit 30 controls the entire processing of the access control apparatus 10.

These structural components may be implemented hardwarewise by elements such as a CPU, memory and other LSIs of an arbitrary computer, and softwarewise by memory-loaded programs or the like. Depicted herein are functional blocks implemented by cooperation of hardware and software. Therefore, it will be obvious to those skilled in the art that the functional blocks may be implemented by a variety of manners including hardware only, software only or a combination of both.

Figure 5:
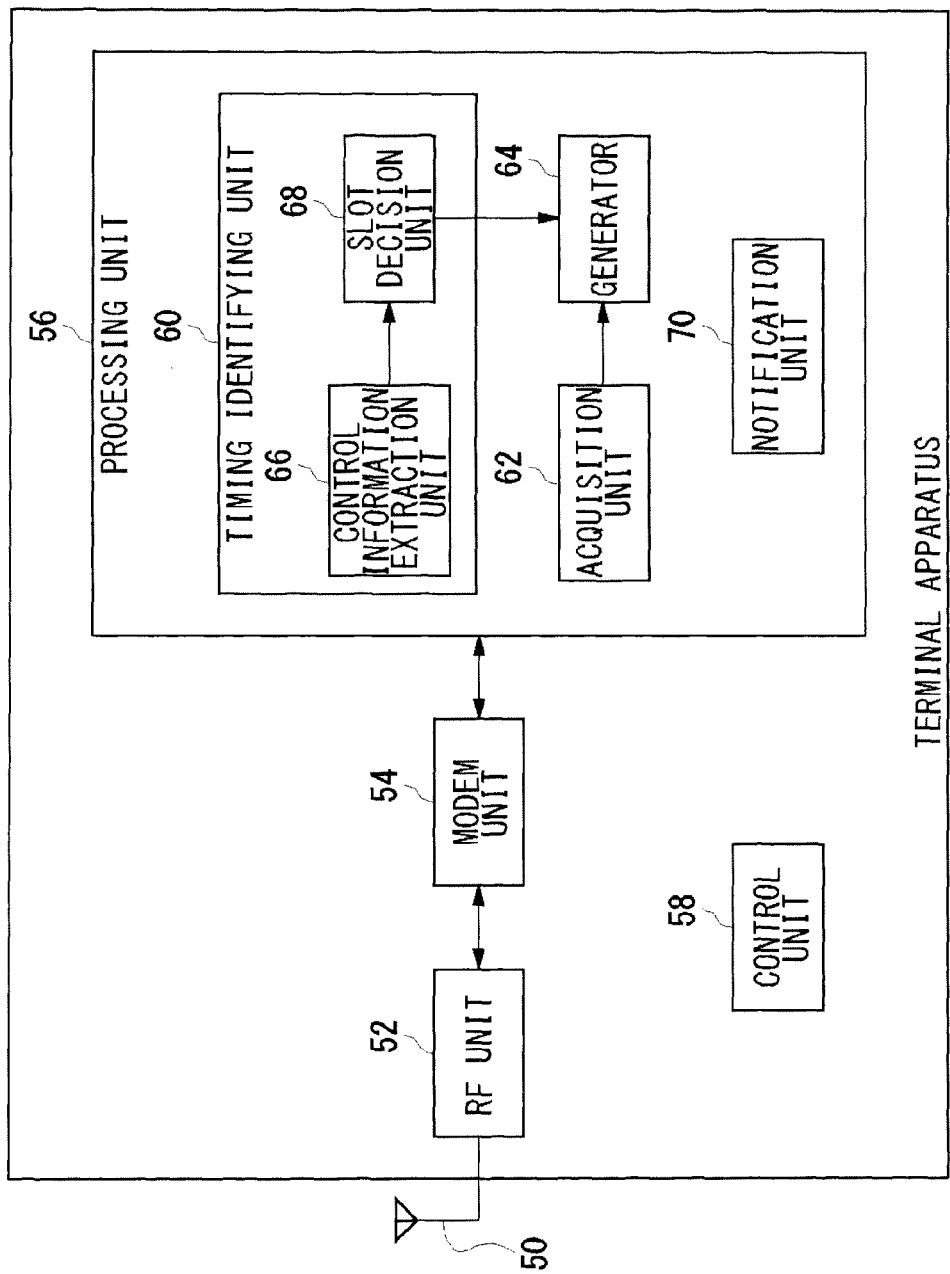
FIG. 5 shows a structure of a terminal apparatus mounted on a vehicle of FIG. 1.

FIG. 5 shows a structure of a terminal apparatus 14 mounted on a vehicle 12. The terminal apparatus 14 includes an antenna 50, an RF unit 52, a modem 54, a processing unit 56, and a control unit 58. The processing unit 56 includes a timing identifying unit 60, an acquisition unit 62, a generator 64, and a notification unit 70. The timing identifying unit 60 includes a control information extraction unit 66 and a slot decision unit 68. The antenna 50, the RF unit 52 and the modem unit 54 carry out the processings similar to those carried out by the antenna 20, the RF unit 22 and the modem 24 of FIG. 2, respectively. Thus, the repeated description thereof is omitted here.

The acquisition unit 62 includes a GPS receiver, a gyroscope, a vehicle speed sensor, and so forth all of which are not shown in FIG. 5. The acquisition unit 62 acquires the present position, traveling direction, traveling speed and so forth of the vehicle 12, based on data supplied from the aforementioned not-shown components of the acquisition unit 62. The present position thereof is indicated by the latitude and longitude. Known art may be employed to acquire them and therefore the description thereof is omitted here. The acquisition unit 62 outputs the thus acquired information to the generator 64.

The control information extraction unit 66 receives the demodulation result fed from the modem unit 54. Of the demodulation result, the control information extraction unit 66 monitors a part of subcarriers corresponding to the identification carrier. If valid data is contained in the part of subcarriers corresponding to the identification carrier, the control information extraction unit 66 will recognize that the control information extraction unit 66 is receiving a slot containing the control information therein. Also, the control information extraction unit 66 establishes the synchronization between frames and slots when the timing with which the slot containing the control information is received is used as a reference. Further, the control information extraction unit 66 acquires information on empty slots and information on collision slots, from the control information. The control information extraction unit 66 outputs the information on empty slots and the information on collision slots to the slot decision unit 68.

The slot decision unit 68 receives the information on empty slots and the information on collision slots, from the control information extraction unit 66. The slot decision unit 68 selects one empty slot, based on the information on empty slots. Note that one empty slot may be selected arbitrarily. The slot decision unit 68 outputs the information on the selected empty slot to the generator 64. The generator 64 receives the information fed from the acquisition unit 62. The generator 64 generates data, based on said information wherein the data is formed as shown in FIG. 4B. Also, the generator 64 receives an instruction on the empty slot from the slot decision unit 68 and outputs the data to the modem unit 54 using the empty slot associated with the instruction. Note that the processing unit 56 may conduct carrier sense before the data is outputted. For the next frame, too, the generator 64 outputs the data using the slot of the same slot number.

While such processing continues, the control information extraction unit 66 continues to extract the information on empty slots and the information on collision slots, from the control information, frame by frame. The slot decision unit 68 checks to see if any of the slot numbers corresponding to the slots in current use is mistakenly taken as a collision slot. If no slot is taken mistakenly as a collision slot, the slot decision unit 68 will continue to output the same slot numbers as before to the generator 64, based on the information on collision slots. If, on the other hand, any slot is mistakenly taken as a collision slot, the slot decision unit 68 will select again an empty slot based on the information on empty slots. In other words, another slot, which is different from the slot selected before, is now selected. The slot decision unit 68 outputs the information on the newly selected empty slot to the generator 64. From then onward, the generator 64 carries out the processing similar to that described above. The notification unit 70 acquires data sent from another terminal apparatus 14 (not shown) and informs a driver that another vehicle 12 is approaching and so forth. The processing carried out by the notification unit 70 is not limited thereto. The control unit 58 controls the entire operation of the terminal apparatus 14.

Figure 6:
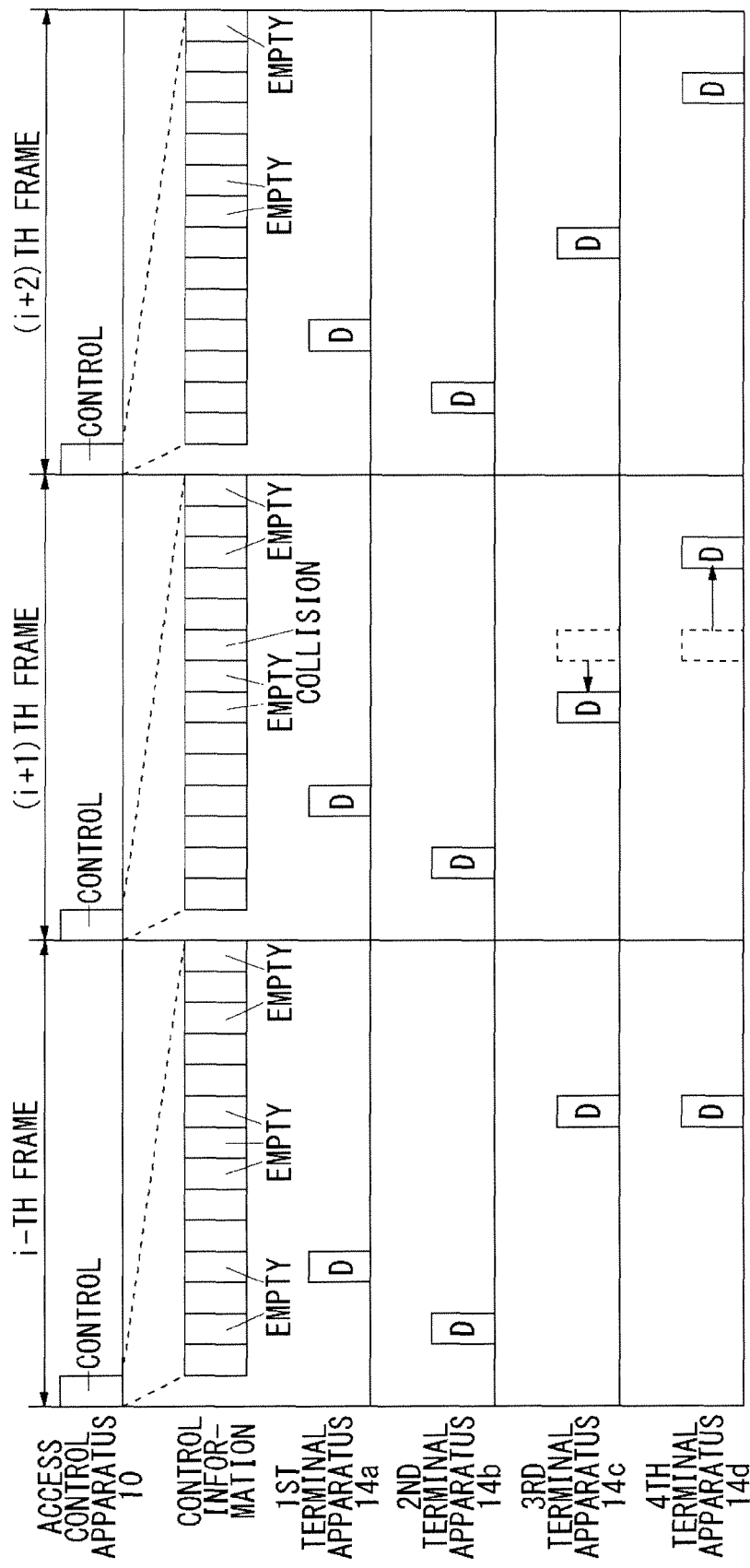
FIG. 6 shows an operational overview of the communication system of FIG. 1.

An operation of the communication system 100 configured as above is now described. FIG. 6 shows an operational overview of the communication system 100. The horizontal direction of FIG. 6 corresponds to time, and three frames that are an ith frame to an (i+2)th frame are indicated in the top row of FIG. 6. Assume herein for the clarity of description that each frame contains 15 slots. As shown in FIG. 6, the access control apparatus 10 broadcasts the control information using the leading slot of each frame. "Control" in FIG. 6 indicates control information. Below "control", information on empty slots and information on collision slots both contained in the control information are indicated by associating them with slots. "Empty" in FIG. 6 indicates an empty slot, whereas "collision" in FIG. 6 indicates a collision slot.

In the rows below the top row, the timings with which the first terminal apparatus 14a to the fourth terminal apparatus 14d broadcast the data are indicated. "D" in FIG. 6 means data. The first terminal apparatus 14a to the fourth terminal apparatus 14d each references the control information and selects an empty slot. The first terminal apparatus 14a to fourth terminal apparatus 14d each broadcasts the data using the selected empty slot in the ith frame. The empty slot selected by the third terminal apparatus 14c is identical to the empty slot selected by the fourth terminal apparatus 14d, the data broadcast from them collide with each other. The access control apparatus 10 detects the occurrence of collision in said slot. The control information, broadcast from the access control apparatus 10, in the (i+1)th frame indicates the slot where the collision occurs, as the information on the collision slot.

Since no collision occurs in the slots used by the first terminal apparatus 14a and the second terminal apparatus 14b, the slots having the same slot numbers are used again. On the other hand, since collision has occurred in the slots used by the third terminal apparatus 14c and the fourth terminal apparatus 14d, another empty slots are selected again. The third terminal apparatus 14c and the fourth terminal apparatus 14d broadcast data, using the selected empty slots. Since no collision occurs in all of data, no collision slot is indicated in the control information, broadcast from the access control apparatus 10, in the (i+2)th frame. Thus, the first terminal apparatus 14a to the fourth terminal apparatus 14d use again the slots having the same slot numbers as the slots used already.

Figure 7:
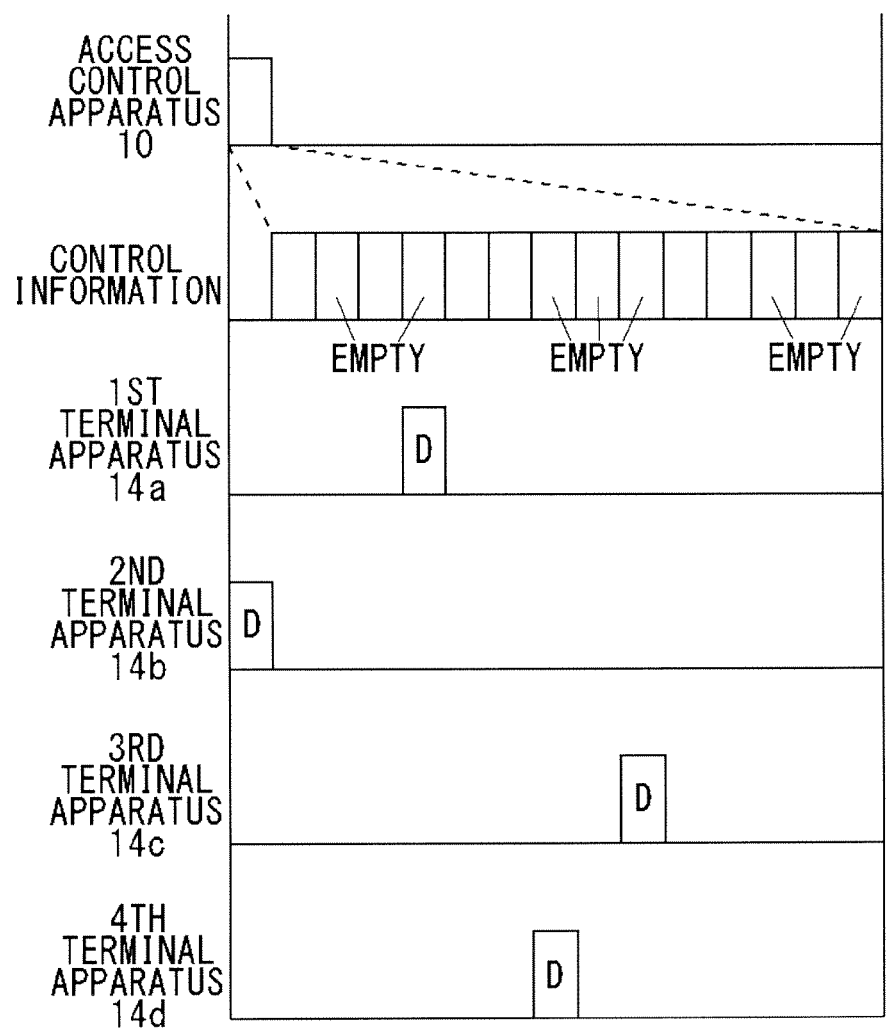
FIG. 7 shows another operational overview of the communication system of FIG. 1.

FIG. 7 is shows another operational overview of the communication system 100. FIG. 7 is represented in a similar manner to FIG. 6. As a precondition in FIG. 7, the second terminal apparatus 14b is incapable of receiving the control information sent from the access control apparatus 10. Thus, the second terminal apparatus 14b transmits data without being aware of the frame construction. The access control apparatus 10 broadcasts the control information, using the leading slot in a frame. At the same time, the second terminal apparatus 14b broadcasts data, using the leading slot in a frame. As a result, the control information and the data collide in said slot. Even though the collision occurs, the first terminal apparatus 14a, the third terminal apparatus 14c and the fourth terminal apparatus 14d can detect the presence of control information by observing the signal components of identification carriers in the control information.

Figure 8:
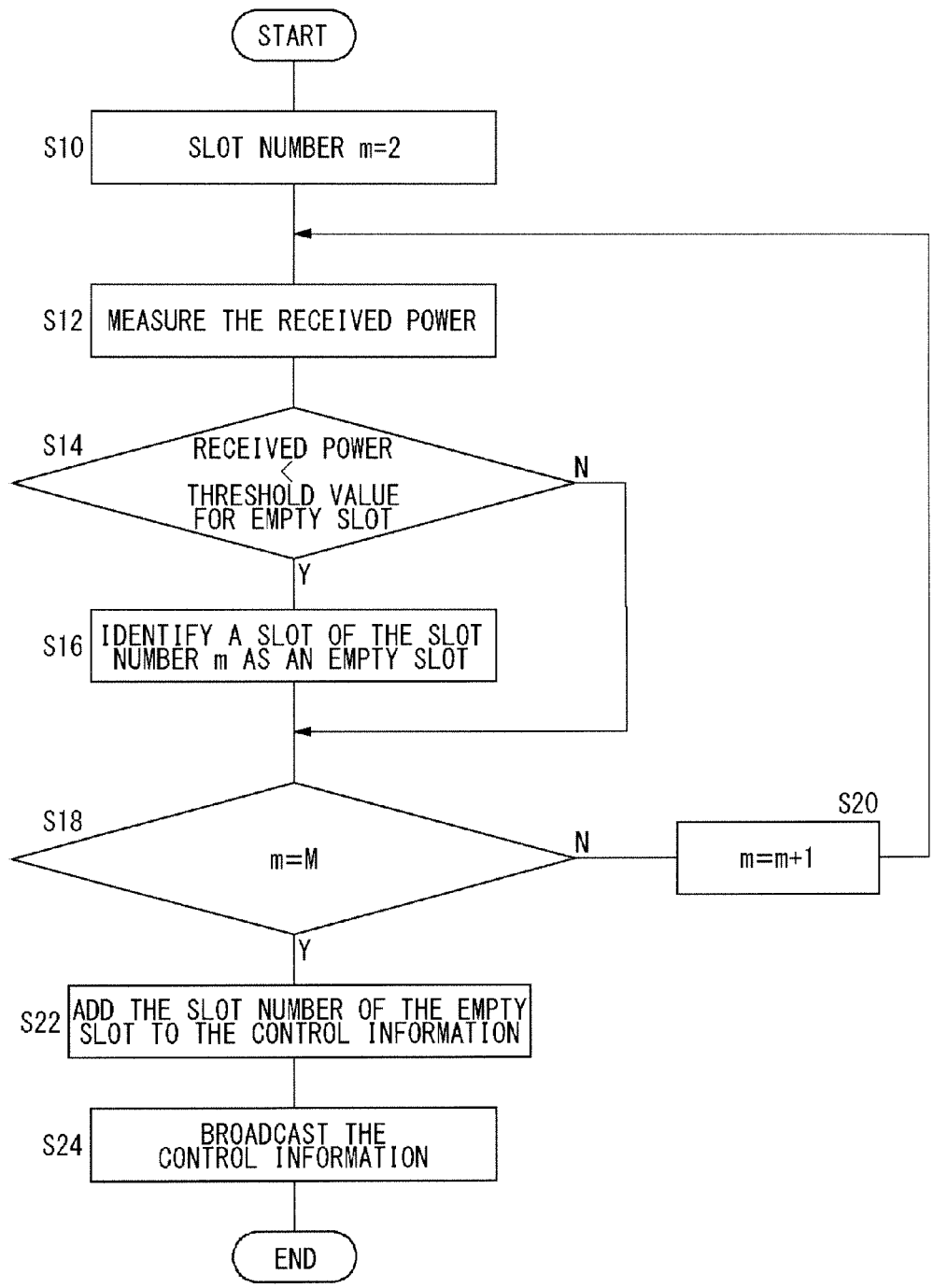
FIG. 8 is a flowchart showing a procedure in which the access control apparatus of FIG. 2 conveys an empty slot.

FIG. 8 is a flowchart showing a procedure in which the access control apparatus 10 conveys an empty slot. The detecting unit 32 sets the slot number m to "2" (S10). The power measuring unit 38 measures the received power (S12). If the received power is less than the threshold value for empty slot (Y of S14), the empty slot identifying unit 42 will identify the slot of the slot number m as an empty slot (S16). If the received power is not less than the threshold value for empty slot (N of S14), the empty slot identifying unit 42 will skip Step S16. If the slot number m is not equal to the maximum number M (N of S18), the detecting unit 32 will increment the slot number m by 1 (S20) and the process will return to Step S12. If, on the other hand, the slot number m is the maximum number M (Y of S18), the generator 36 will add the slot number of the empty slot to the control information (S22). The modem unit 24 and the RF unit 22 broadcast the control information (S24).

Figure 9:
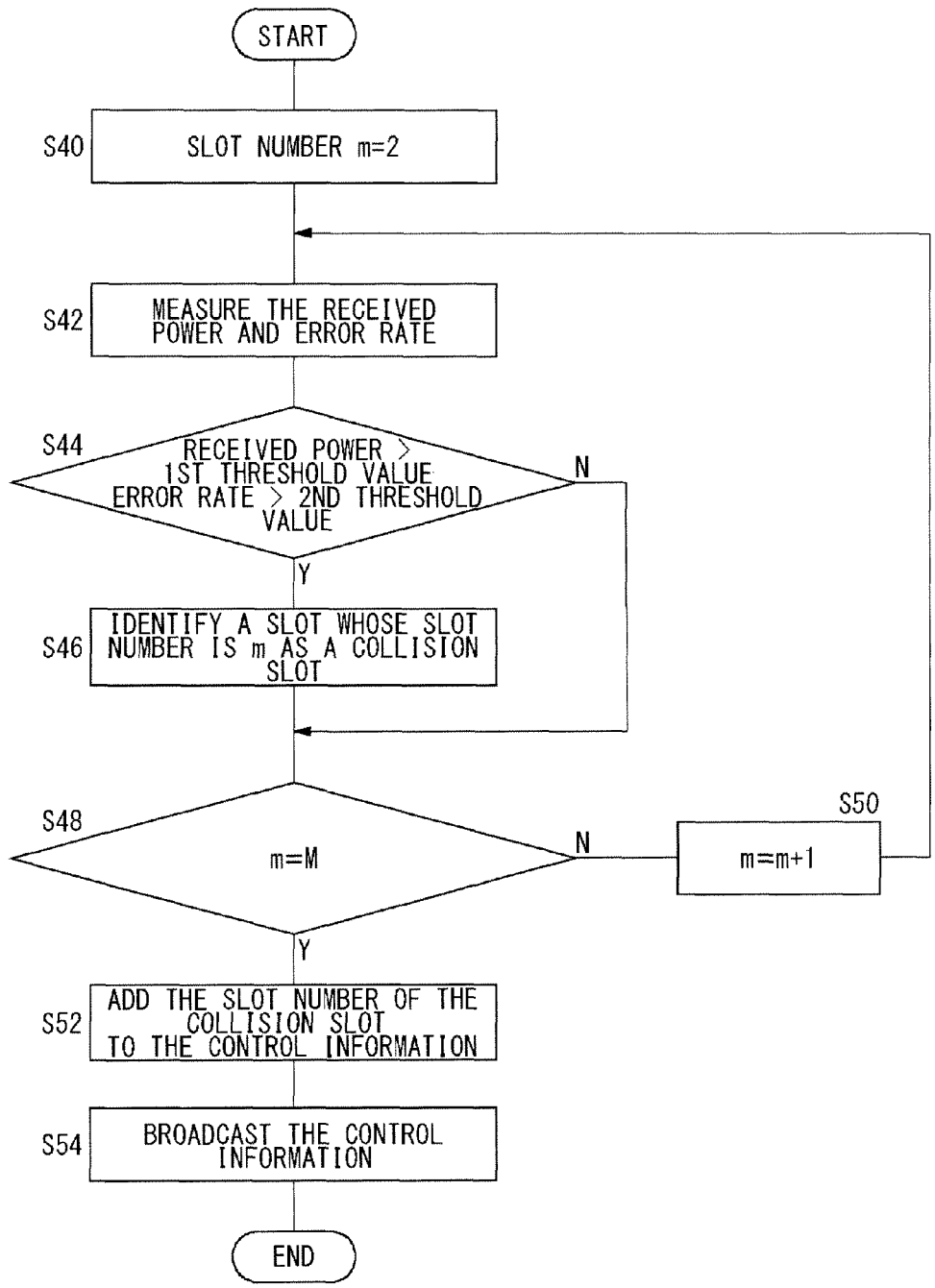
FIG. 9 is a flowchart showing a procedure in which the access control apparatus of FIG. 2 conveys a collision slot.

FIG. 9 is a flowchart showing a procedure in which the access control apparatus 10 conveys a collision slot. The detecting unit 32 sets the slot number m to "2" (S40). The power measuring unit 38 measures the received power, and the quality measuring unit 40 measures the error rate (S42). If the received power is greater than the first threshold value and the error rate is greater than the second threshold value (Y of S44), the collision slot identifying unit 44 will identify the slot of the slot number m as a collision slot (S46). If the received power is not greater than the first threshold value or the error rate is not greater than the second threshold value (N of S44), the collision slot identifying unit 44 will skip Step S46. If the slot number m is not equal to the maximum number M (N of S48), the detecting unit 32 will increment the slot number m by 1 (S50) and the process will return to Step S42. If, on the other hand, the slot number m is the maximum number M (Y of S48), the generator 36 will add the slot number of the collision slot to the control information (S52). The modem unit 24 and the RF unit 22 broadcast the control information (S54).

Figure 10:
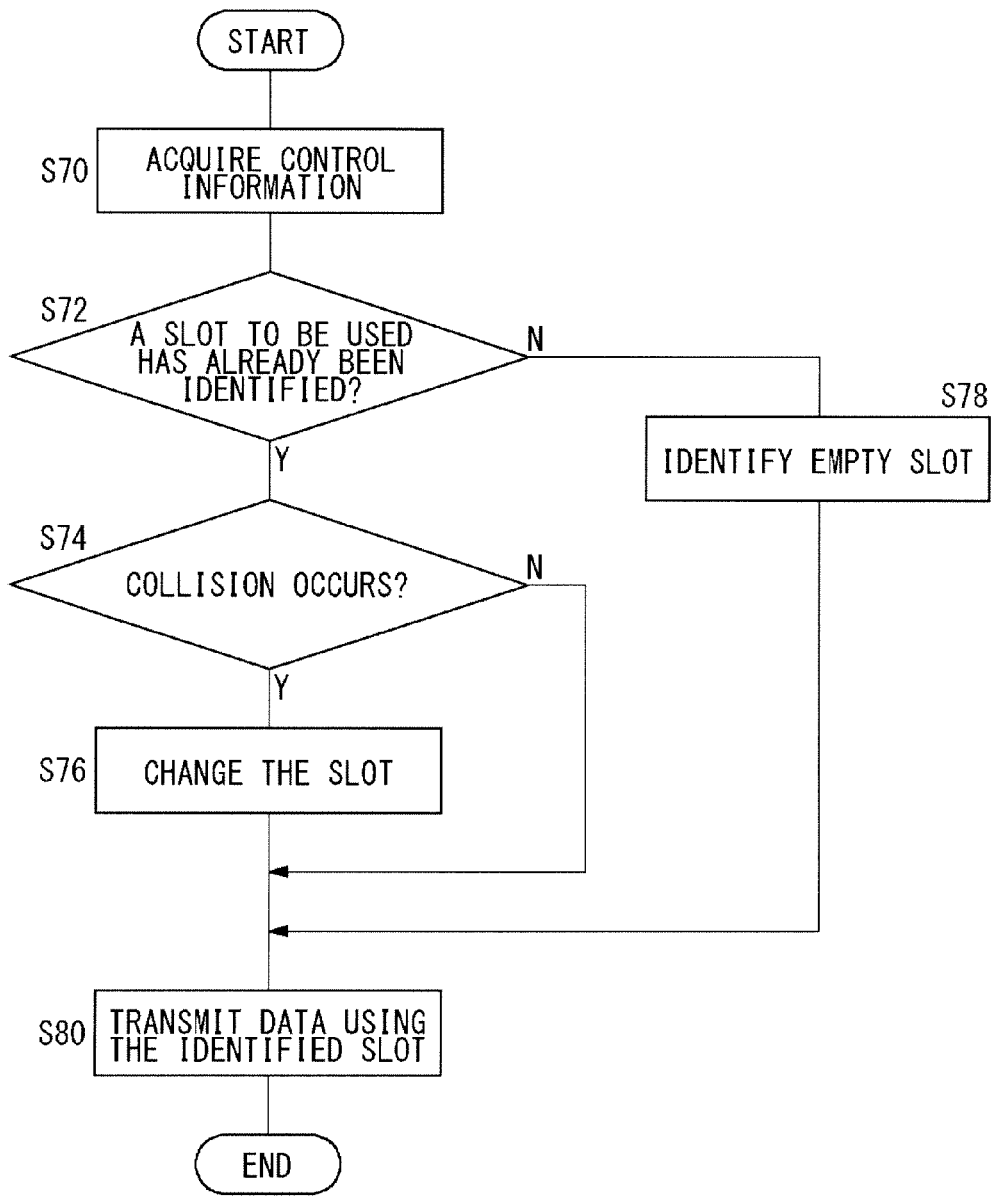
FIG. 10 is a flowchart showing a data transmission procedure performed by the terminal apparatus of FIG. 5.

FIG. 10 is a flowchart showing a data transmission procedure performed by the terminal apparatus 14. The control information extraction unit 66 acquires the control information (S70). If a slot to be used has already been identified (Y of S72), the slot decision unit 68 will verify whether collision occurs in this slot or not. If collision occurs (Y of S74), the slot decision unit 68 will change the slot (S76). If no collision occurs (N of S74), Step S76 will be skipped. If, on the other hand, a slot to be used has not already been identified (N of S72), the slot decision unit 68 will identify empty slot(s) (S78). The generator 64 transmits data, using the thus identified slot (S80).

By employing the exemplary embodiment of the present invention, the slots usable in communication between a plurality of terminal apparatuses are detected from among a plurality of slots and the thus detected slots are broadcast. Thus, the probability of collisions occurring in communication between the plurality of terminal apparatuses is reduced. Since the probability of collisions in communication between the plurality of terminal apparatuses is reduced, the collision probability of packet signals under conditions of increased volume of communication can be reduced. Since empty slots are identified based on the respective received powers of the plurality of slots, the empty slots can be easily identified. Since the slot number of an empty slot which is contained in a previous frame is broadcast, the instructions to the terminal apparatuses can be executed reliably. Since a terminal apparatus, which is using the empty slot, uses a slot that corresponds to said slot, over a plurality of frames, the processing can be simplified. Also, the access control apparatus does not directly participate in the data communication between terminal apparatuses and only conveys a parameter related to the empty slots. Hence, the structure and operation according to the exemplary embodiment are easily applicable to a communication system premised on CSMA/CA, too.

Also, the slot in which a collision has occurred due to duplicate transmission of signals from the plurality of terminal apparatuses is detected and broadcast. Thus, the probability of collisions occurring in communication between the plurality of terminal apparatuses can be reduced. Also, the collision slots are identified based on the respective received powers of the plurality of slots and the respective signal qualities of the plurality of slots, so that the collision slots can be easily identified. Also, the slot number of a collision slot which is contained in a previous frame is broadcast, so that the instructions to the terminal apparatuses can be executed reliably. Also, the access control apparatus does not directly participate in the data communication between terminal apparatuses and only conveys a parameter related to the collision slots. Hence, the structure and operation according to the exemplary embodiment are easily applicable to a communication system premised on CSMA/CA, too.

Also, the identification carriers in the control information are not used for data, whereas the remaining subcarriers are also used for data. Thus, even if the control information and data signals collide, the presence of the control information can be detected by observing the signal components of the control information. Also, the guard band is provided between the identification carrier and the other subcarriers, so that the interference therebetween can be reduced and the probability of arrival of information transmitted using the identification carrier can be improved. Also, important information is assigned to the identification carrier, so that the probability of arrival of important information can be improved. Also, the UW is assigned to the identification carrier, so that the degree of accuracy in detecting the identification carriers can be improved.

The present invention has been described based on the exemplary embodiment. This exemplary embodiment is intended to be illustrative only, and it is understood by those skilled in the art that various modifications to constituting elements and processes as well as arbitrary combinations thereof could be developed and that such modifications and combinations are also within the scope of the present invention.

In the exemplary embodiment of the present invention, the frame specifying unit 34 specifies frames each of which is constituted by a plurality of slots. However, this should not be considered as limiting and, for example, the frame specifying unit 34 may provide periods (fields) other than the plurality of slots, in each frame. More specifically, a plurality of slots may be assigned in a partial period of a frame, whereas the CSMA/CA method may be used in communication between a plurality of terminal apparatuses 14 in the remaining periods. In such a case, the access control apparatus 10 does not detect the empty slots and collision slots while the CSMA/CA method is in use. According to this modification, each terminal apparatus 14 can select the communication mode between a communication using slots and a communication using the CSMA/CA method. Hence, the degree of freedom in communications can be increased. In other words, it suffices that each frame contains a plurality of slots.

In the exemplary embodiment of the present invention, the control information broadcast from the access control apparatus 10 and the data broadcast from a terminal apparatus 14 are each assigned to a single slot. However, this should not be considered as limiting and, for example, the control information and the data may each be assigned to two or more slots. According to this modification, the transmission rate of control information and data can be increased.

In the exemplary embodiment of the present invention, an identification carrier is equivalent to two subcarriers. Also, the identification carrier is assigned to the subcarriers near the center frequency of an OFDM symbol. However, this should not be considered as limiting and, for example, the identification carrier may be equivalent to two or more subcarriers. For example, the identification carrier may be assigned to subcarriers other than those near the center frequency of an OFDM symbol. In such a case, the information on empty slots and the information on collision slots may be added to the identification carrier. According to this modification, the communication system 100 can be designed more freely.

DESCRIPTION OF THE REFERENCE NUMERALS

10 Access control apparatus
12 Vehicle
14 Terminal apparatus
20 Antenna
22 RF unit
24 Modem unit
26 Processing unit
28 GPS positioning unit
30 Control unit
32 Detecting unit
34 Frame specifying unit
36 Generator
38 Power measuring unit
40 Quality measuring unit
42 Empty slot identifying unit
44 Collision slot identifying unit
50 Antenna
52 RF unit
54 Modem unit
56 Processing unit
58 Control unit
60 Timing identifying unit
62 Acquisition unit
64 Generator
66 Control information extraction unit
68 Slot decision unit
70 Notification unit
100 Communication system

INDUSTRIAL APPLICABILITY

The present invention reduces the collision probability of packet signals even when the communication volume has increased.

What is claimed is:

1. An access control apparatus for controlling communications between terminal apparatuses, the access control apparatus comprising:
    a detecting unit configured to detect a predetermined slot from among a plurality of slots, wherein a frame containing a plurality of slots and periods is repeated, and CSMA/CA communication is used between terminal apparatuses in the periods of the frame; and
    a broadcasting unit configured to broadcast information on the predetermined slot detected by said detecting unit, wherein
    the access control apparatus is provided separately from terminal apparatuses,
    the access control apparatus is configured to control the communications between the terminal apparatuses without directly designating for the terminal apparatuses a slot that is used for data communication even when the terminal apparatuses perform data communication, and
    the detecting unit is configured not to detect the predetermined slot in the periods of the frame other than the plurality of slots, but allows the terminal apparatuses to perform the CSMA/CA communication in the periods in which the CSMA/CA communication is used between terminal apparatuses.

2. An access control apparatus for controlling communications between terminal apparatuses, the access control apparatus comprising:
    a detecting unit configured to detect an empty slot usable in the communications between the terminal apparatuses, from among a plurality of slots, wherein a frame containing a plurality of slots and periods is repeated, and CSMA/CA communication is used between terminal apparatuses; and
    a broadcasting unit configured to broadcast information on the empty slot detected by said detecting unit, wherein
    the access control apparatus is provided separately from terminal apparatuses, the access control apparatus is configured to control the communications between the terminal apparatuses without directly designating for the terminal apparatuses a slot that is used for data communication even when the terminal apparatuses perform data communication, and the detecting unit is configured not to detect the empty slot in the periods of the frame other than the plurality of slots, but allows the terminal apparatuses to perform the CSMA/CA communication in the periods in which the CSMA/CA communication is used between terminal apparatuses.

3. An access control apparatus according to claim 2, said detecting unit including:
   a measurement unit configured to measure received power of each of the plurality of slots; and
   an identifying unit configured to identify a slot whose received power measured by the measurement unit is less than a threshold value as being an empty slot.

4. An access control apparatus according to claim 2, wherein said broadcasting unit broadcasts the information, using periodically at least one slot contained in each frame, and
   a slot number of the empty slot, which is detected by said detecting unit and is contained in a previous frame, is added as said information to be broadcast by said broadcasting unit.

5. An access control apparatus according to claim 2, wherein a terminal apparatus using a slot according to the information broadcasted from said broadcasting unit uses a slot corresponding to said slot.

6. An access control apparatus for controlling communications between terminal apparatuses, the access control apparatus comprising:
   a detecting unit configured to detect a collision slot, in which a collision has occurred due to duplicate transmission of signals from a plurality of terminal apparatuses, wherein a frame containing a plurality of slots and periods is repeated, CSMA/CA communication is used between terminal apparatuses in the periods of the frame, and the terminal apparatuses communicate with each other using a predetermined slot; and
   a broadcasting unit configured to broadcast information on the slot detected by said detecting unit, wherein
   the access control apparatus is provided separately from terminal apparatuses,
   the access control apparatus is configured to the control the communications between the terminal apparatuses without directly designating for the terminal apparatuses a slot that is used for data communication even when the terminal apparatuses perform data communication, and
   the detecting unit is configured not to detect the collision slot in the periods of the frame other than the plurality of slots, but allows the terminal apparatuses to perform the CSMA/CA communication in the periods in which the CSMA/CA communication is used between terminal apparatuses.

7. An access control apparatus according to claim 6, said detecting unit including:
   a first measurement unit configured to measure the respective received powers of the plurality of slots;
   a second measurement unit configured to measure the respective signal qualities of the plurality of slots; and
   an identifying unit configured to identify a slot whose received power measured by the first measurement unit is less than a first threshold value and whose signal quality measured by the second measurement unit is worse than a second threshold value as being a collision slot.

8. An access control apparatus according to claim 6, wherein
   said broadcasting unit broadcasts the information, using periodically at least one slot contained in each frame, and
   a slot number of the collision slot, which is detected by said detecting unit and is contained in a previous frame, is added as said information to be broadcast by said broadcasting unit.

9. A broadcasting method employed in an access control apparatus for controlling communications between terminal apparatuses, the method comprising:
   detecting a predetermined slot from among a plurality of slots, wherein a frame containing a plurality of slots and periods is repeated, and CSMA/CA communication is used between terminal apparatuses in the periods of the frame; and
   broadcasting information on the detected predetermined slot, wherein
   the access control apparatus is provided separately from terminal apparatuses,
   the access control apparatus is configured to control the communications between the terminal apparatuses without directly designating for the terminal apparatuses a slot that is used for data communication even when the terminal apparatuses perform data communication, and
   the detecting does not detect the predetermined slot in the periods of the frame other than the plurality of slots, but allows the terminal apparatuses to perform the CSMA/CA communication in the periods in which the CSMA/CA communication is used between terminal apparatuses.

10. A broadcasting method employed in an access control apparatus for controlling communications between terminal apparatuses, the method comprising:
    detecting an empty slot usable in the communications between the terminal apparatuses, from among a plurality of slots, wherein a frame containing a plurality of slots and periods is repeated, and CSMA/CA communication is used between terminal apparatuses in the periods of the frame; and
    broadcasting information on the detected empty slot, wherein
    the access control apparatus is provided separately from terminal apparatuses,
    the access control apparatus is configured to control the communications between the terminal apparatuses without directly designating for the terminal apparatuses a slot that is used for data communication even when the terminal apparatuses perform data communication, and
    the detecting does not detect the empty slot in the periods of the frame other than the plurality of slots, but allows the terminal apparatuses to perform the CSMA/CA communication in the periods in which the CSMA/CA communication is used between terminal apparatuses.

11. A broadcasting method employed in an access control apparatus for controlling communications between terminal apparatuses, the method comprising:
    detecting a collision slot, in which a collision has occurred due to duplicate transmission of signals from a plurality of terminal apparatuses, wherein a frame containing a plurality of slots and periods is repeated, CSMA/CA communication is used between terminal apparatuses in the periods of the frame, and the terminal apparatuses communicated with each other using a predetermined slot; and broadcasting information on the detected collision slot, wherein the access control apparatus is provided separately from terminal apparatuses, the access control apparatus is configured to control the communications between the terminal apparatuses without directly designating for the terminal apparatuses a slot that is used for data communication even when the terminal apparatuses perform data communication, and the detecting does not detect the collision slot in the periods of the frame other than the plurality of slots, but allows the terminal apparatuses to perform the CSMA/CA communication in the periods in which the CSMA/CA communication is used between terminal apparatuses.

* * * * *